(12) United States Patent
Singh (10) Patent No.: US 11,803,837 B2
(45) Date of Patent: Oct. 31, 2023

(54) INTELLIGENT REAL TIME CARD ALERT SYSTEM TO DETECT SUSPICIOUS CONTACTLESS CARD READER

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/393,583

(22) Filed: Aug. 4, 2021

(65) Prior Publication Data

US 2023/0042425 A1  Feb. 9, 2023

(51) Int. Cl.
*G06Q 20/40* (2012.01)
*G06Q 20/34* (2012.01)
*G06Q 20/10* (2012.01)
*H04L 9/40* (2022.01)

(52) U.S. Cl.
CPC ....... *G06Q 20/352* (2013.01); *G06Q 20/1085* (2013.01); *G06Q 20/4016* (2013.01)

(58) Field of Classification Search
None
See application file for complete search history.

(56) References Cited

U.S. PATENT DOCUMENTS

| | | | |
|---|---|---|---|
| 7,949,373 B2 | 5/2011 | Whiting | |
| 8,256,667 B2 | 9/2012 | Poznansky et al. | |
| 8,386,349 B2 | 2/2013 | Dixon et al. | |
| 2006/0165060 A1* | 7/2006 | Dua | H04W 12/06 705/76 |
| 2006/0243798 A1* | 11/2006 | Kundu | G06Q 20/4016 235/383 |
| 2017/0308909 A1* | 10/2017 | Faith | G06V 40/172 |
| 2018/0173789 A1* | 6/2018 | Llagostera | G06N 3/0445 |
| 2021/0297412 A1* | 9/2021 | Thayyilsubramanian | G06Q 20/4014 |

* cited by examiner

*Primary Examiner* — Bruce I Ebersman
*Assistant Examiner* — Bhavin D Shah
(74) *Attorney, Agent, or Firm* — Banner & Witcoff, Ltd.

(57) ABSTRACT

Aspects of the disclosure relate to a smart contactless card to detect real-time suspicious card readers or other fraudulent devices. Prior to a transaction, the smart contactless card detects suspicious card readers or fraudulent devices. An alert may be generated upon detection of any suspicious or fraudulent card reader. In some arrangements, the smart contactless card may utilize machine learning models or machine learning capabilities to detect suspicious card readers. The smart contactless card may pair with other smart contactless cards to detect and alert users to suspicious card readers or other fraudulent devices. The paired smart contactless cards may share information regarding suspicious card readers or fraudulent devices over a semi-autonomous data-sharing network. A vulnerability score may be generated and used to determine if a card reader or other payment device is suspicious.

8 Claims, 6 Drawing Sheets

INTELLIGENT REAL TIME CARD ALERT SYSTEM TO DETECT SUSPICIOUS CONTACTLESS CARD READER

BACKGROUND

Aspects of the disclosure relate to electrical computers, systems, and devices for detecting suspicious contactless card readers.

Contactless cards are becoming prevalent to conduct sales transactions. Contactless cards make is easier for a user to purchase items as it reduces the time for completing sales transactions. Users simply have to position the card close enough to the reader for the reader to complete the transaction. Contactless card readers may be found installed on gas pumps, vending machines, and even automatic teller machines (ATMs).

One concern with use of contactless readers is that a user does not know if the actual reader used to complete the transaction is legitimate. For example, users are not able to determine if the contactless card reader is suspicious or not. Currently, there is no method available on contactless cards to promptly alert users about suspicious contactless card readers or older point of sale readers.

Skimmers and other illegal card reader devices are a growing problem in which a user's information may be compromised without the user even being aware of the theft. There is a need to develop capability on payment cards to detect suspicious card readers or other fraudulent devices at point of sale interaction.

SUMMARY

In light of the foregoing background, the following presents a simplified summary of the present disclosure in order to provide a basic understanding of various aspects of the disclosure. The summary is not limiting with respect to the exemplary aspects of the disclosure described herein and is not an extensive overview of the disclosure. It is not intended to identify key or critical elements of or steps in the disclosure or to delineate the scope of the disclosure. Instead, as would be understood by a person of ordinary skill in the art, the following summary merely presents some concepts of the disclosure in simplified form as a prelude to the more detailed description provided below. Moreover, sufficient written descriptions of the embodiments of this application are disclosed in the specification throughout this application along with exemplary, non-exhaustive, and non-limiting manners and processes of making and using the inventions, in such full, clear, and concise, and exact terms in order to enable skilled artisans to make and use the inventions without undue experimentation and sets forth the best mode contemplated by the inventor for carrying out the inventions.

Aspects of this disclosure address one or more shortcomings in the industry by providing a smart contactless card to detect real-time suspicious card readers or other fraudulent devices. In some embodiments, the smart contactless card may include on board circuitry and architecture to detect on the edge any proximate suspicious card readers prior to initiating any transactions. In some arrangements, the smart contactless card may utilize machine learning models or machine learning capabilities to detect suspicious card readers.

In accordance with one or more embodiments, a smart contactless card may pair with other smart contactless cards to detect and alert users to detected suspicious card readers or other fraudulent devices. The paired smart contactless cards may share information regarding suspicious card readers or fraudulent devices over a semi-autonomous data-sharing network.

In some embodiments, a vulnerability score may be generated and used to determine if a card reader or other payment device is suspicious. The generated scores may be transmitted and shared by paired smart contactless cards. In a further embodiment, the generated scores may be updated based on new interactions with the card reader by any of paired smart contactless cards.

In an aspect of the disclosure, a computing environment may include one or more data centers and one or more computing devices, including computing devices located at or within such data centers and computing devices not located at or within such data centers. For example, a computing environment may include a first data center. The data center may include a card issuer computing platform. The computing environment may also include a user device, a point-of-sale terminal, and/or an ATM.

In some arrangements, a data center may be a distinct and physically separate data center operated by and/or otherwise associated with an organization, such as a financial institution. In addition, the data center may house a plurality of server computers and various other computers, network components, and devices.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting.

Figure 1:
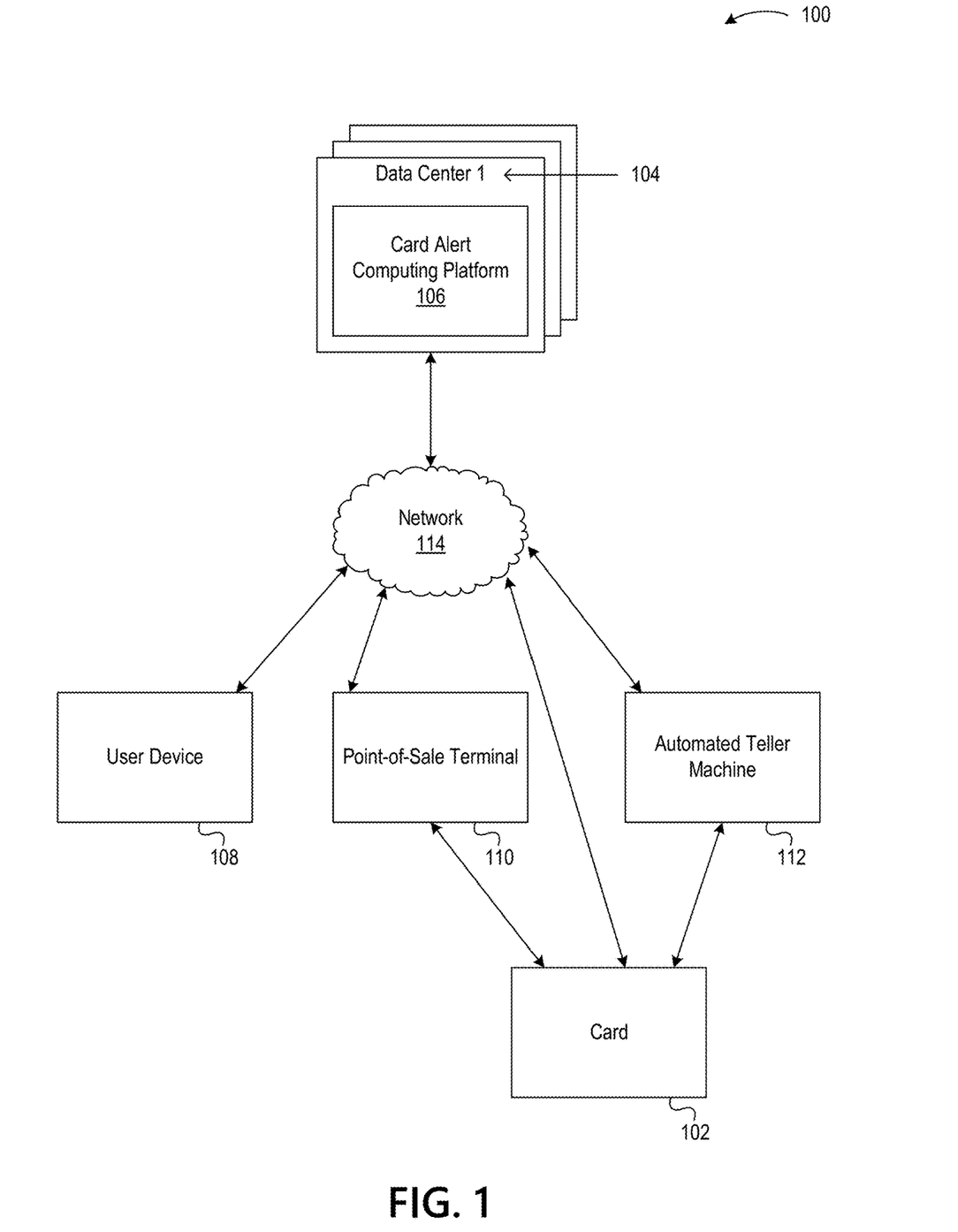
FIG. 1 illustrates a computing environment for detecting a suspicious card reader or fraudulent device in accordance with one or more aspects described herein.

FIG. 1 depicts an illustrative computing environment 100 for using a smart contactless card 102 with various embodiments of the disclosure. Computing environment 100 may include one or more data centers and one or more computing devices, including computing devices located at or within such data centers and computing devices not located at or within such data centers. For example, computing environment 100 may include a first data center 104. Data center 104 may include a card alert computing platform 106. Computing environment 100 also may include a user device 108, a point-of-sale terminal 110, and/or an automated teller machine 112.

Data center 104 may be a distinct and physically separate data center operated by and/or otherwise associated with an organization, such as a financial institution. In addition, data center 104 may house a plurality of server computers and various other computers, network components, and devices.

In an aspect of the disclosure, a card alert computing platform 106 may be configured to provide one or more portal interfaces to one or more client devices and/or may be configured to authenticate and/or monitor one or more client devices, point-of-sale terminals, and/or automated teller machines.

In another aspect of the disclosure, card alert computing platform 106 may be configured to authenticate contactless card readers or other devices that transact with contactless cards. In some instances, a transaction log or other transaction data associated with a contactless card reader may be analyzed by card alert computing platform 106 for suspicious or fraudulent activity.

In some arrangements, the data center 104 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. Additionally or alternatively, the client account server(s) may include and/or integrate with one or more client support servers and/or devices, such as one or more customer service representative devices used by one or more customer service representatives of an organization (which may, e.g., be a financial institution operating data center 106), to connect one or more customers of the organization with one or more customer service representatives of the organization via one or more telephone support sessions, chat support sessions, and/or other client support sessions. In an embodiment, the client support servers may maintain a history of transaction with various card readers for analysis. The analysis may include using machine-learning algorithms to look for suspicious activities associated with a particular reader or device.

In one or more arrangements, a user device 108 may be any type of computing device capable of receiving a user interface, receiving input via the user interface, and communicating the received input to one or more other computing devices. For example, a user device may, in some instances, be and/or include server computers, desktop computers, laptop computers, tablet computers, smart phones, or the like that may include one or more processors, memories, communication interfaces, storage devices, and/or other components. As noted above, and as illustrated in detail below, a user device may, in some instances, be one or more special-purpose computing devices configured to perform specific functions. In an embodiment, user device 108 may receive alerts or communications from smart contactless card 102 or card alert computing platform 106 regarding current or past transactions.

In an embodiment, user device 108 may communicate with card alert computing platform 106 to provide a user with information related to current or previous transactions. In some instances, in addition to being configured to provide uses with transactional information, card alert computing platform 106 also may be configured to provide a mobile banking portal associated with the financial institution to various customers of the financial institution and/or their associated mobile computing devices. Such portals may, for instance, provide customers of the financial institution with access to financial account information (e.g., account balance information, purchase transactions, account statements, recent transaction history information, or the like) and/or may provide customers of the financial institution with menus, controls, and/or other options to schedule and/or execute various transactions (e.g., online bill pay transactions, person-to-person funds transfer transactions, or the like). A card alert computing platform 106 may be configured to provide one or more interfaces that allow for configuration and management of one or more cards, computing devices, and/or computer systems included in the computing environment.

In an embodiment, a computing environment also may include one or more computing platforms. For example, a computing environment may include a card alert computing platform 106. As illustrated in greater detail below, a card alert computing platform 106 may include one or more computing devices configured to perform one or more of the functions described herein. For example, a card alert computing platform 106 may include one or more computers (e.g., laptop computers, desktop computers, servers, server blades, or the like). The computing environment also may include one or more networks 114, which may interconnect one or more of card alert computing platforms, a user device 108, a point-of-sale terminal 110, and/or an automated teller machine 112. For example, a computing environment may include a network 114, which may include one or more public networks, one or more private networks, and/or one or more sub-networks (e.g., local area networks (LANs), wide area networks (WANs), or the like).

The computing environment also may include one or more card interface devices, such as point-of-sale terminal 110 and/or ATM 112. A point-of-sale terminal 110 and/or an ATM 112 may include a card-reading interface, such as an EMV chip interface, a magnetic strip reader, and/or a contactless reader (e.g., near-field communication (NFC), radio-frequency identification (RFID)). The one or more card interface devices, such as point-of-sale terminal 110 and/or automated teller machine 112, are connected to a power source. The one or more card interface devices, such as a point-of-sale terminal 110 and/or ATM 112, may be configured to send information to and receive information from the card alert computing platform 106. This may include, for example, card authentication information, purchase information, and/or card update information (e.g., updated card number, expiration date, name, offers, or the like for display on one or more electronic ink displays of a connected card).

Figure 2:
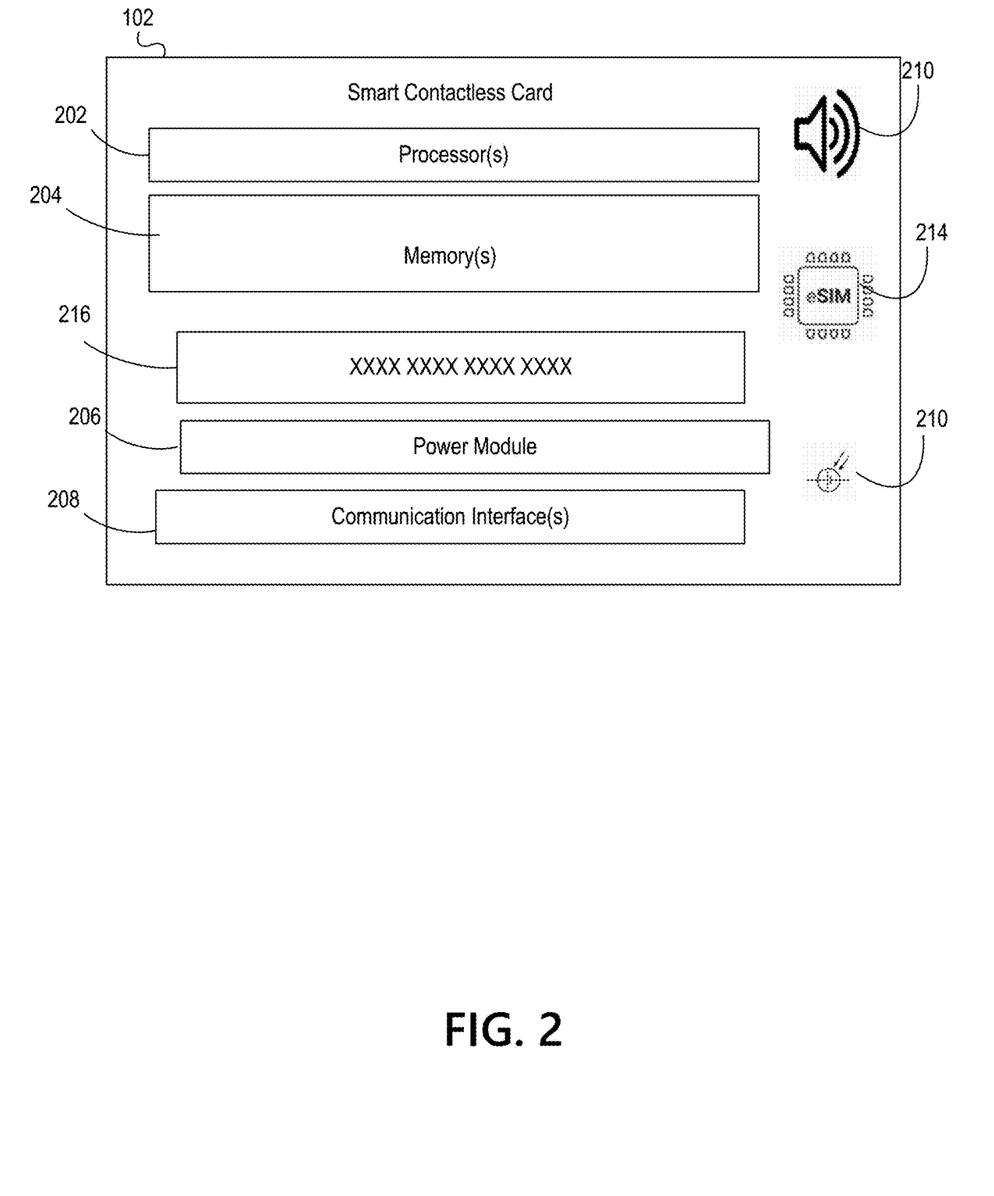
FIG. 2 illustrates a smart contactless card in accordance with one or more aspects described herein.

The computing environment may also include one or more smart contactless cards 102 (e.g., smart contactless credit cards, debit cards, ATM cards). As shown in FIG. 2, in some arrangements of the disclosure, a smart contactless card 102 may include one or more processors 202, memory 204, a power module 206, a communication interface 208, a speaker 210, a photovoltaic 212, and a micro-embedded eSIM 214. In an alternative embodiment, smart contactless card 102 may include a battery or similar power sources. In an embodiment, eSIM 214 may be used to pair with other smart contactless cards to form a card-pairing network to share information regarding suspicious card readers. The card-pairing network may also be connected with other backend networks associated with card alert computing platform 106.

In some arrangements a data bus may interconnect the one or more processors, memory, and communication interface. The communication interface may be a chip (e.g., an EMV chip) configured to support communication between smart contactless card and an interface device (e.g., an EMV chip reader of a point-of-sale terminal or automated teller machine). The chip may be configured to draw power (e.g., electrical current) from the interface device when connected to the interface device. In some embodiments, the EMV chip may be configured according to ISO/IEC 7816 standard. In some other embodiments, the EMV chip may include a contactless chip, such as a contactless chip configured according to ISO/IEC 14443 standard.

Memory may include one or more program modules having instructions that when executed by processor cause the smart contactless card 102 to perform one or more functions described herein. In some instances, the one or more program modules may be stored by and/or maintained in different memory units of the smart contactless card. In some instances, the one or more program modules may be instantiated in custom chips or integrated circuits, such as a custom chip configured to perform set pre-programmed logic.

In some arrangements, smart contactless card 102 may extract transaction logs, error logs, or other transaction data from a card reader. The logs and data contained therein may be extracted via a secure method and processed by the smart contactless card 102. The extracted logs may include historical transactions processed by the card reader. Each transaction in the extracted logs may include a transaction ID, a transaction amount, a transaction time, and a transaction type. In an embodiment, the extracted data may only be read and processed by the smart contactless card 102 or card alert computing platform 106. In this embodiment, users are unable to decipher or understand any extracted data as it is encrypted and securely stored and used by either the smart contactless card 102 and its associated network or the card alert computing platform 106.

Figure 4:
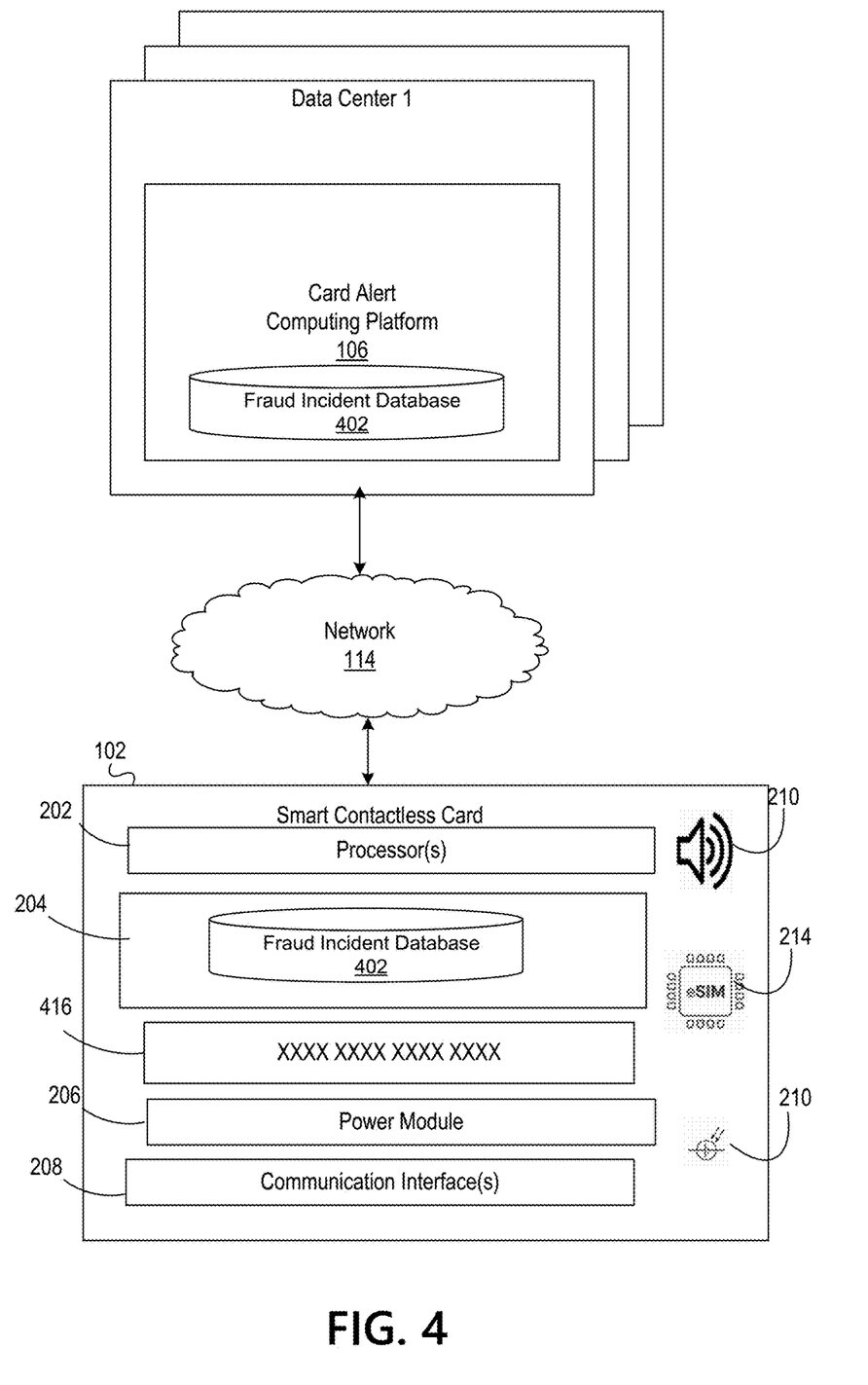
FIG. 4 illustrates generation and operation of a fraud incident database according to one or more aspects described herein.

In an embodiment, smart contactless card 102 determines suspicious behavior at a particular card reader based on the extracted data. The determination may be made in part based on analysis of data patterns possibly linked to transaction IDs and particular card readers. In an embodiment, the extracted data may be compared and/or correlated with existing data found in a fraud incident database 402. Fraud incident database 402 may include determined or reported instances of transaction fraud and associated locations and identification of linked card readers. In an embodiment, a fraud transaction history associated with a particular card reader may be maintained and used to determine new or reoccurring instances of transaction fraud.

Instances of the fraud incident database 402 may be located on board smart contactless card 102 and/or card alert computing platform 106 as shown in FIG. 4. If suspicious behavior is detected, a user may be alerted through an audio sound such as a beep or other audio or visual cues.

In some embodiments, artificial intelligence or machine learning may be used to determine suspicious card readers. In some instances, a Long Short-Term Memory (LSTM) neural network may be used to correlate existing transaction codes with instances of fraud. In other instances, deep scanning may be used to analyze relationship history and frequency of transactions on particular card readers. The use of machine learning and the analysis of transaction history for individual card readers may determine behavior pattern changes for a card reader identifying suspicious behavior or fraud events. In some embodiments, a vulnerability score may be determined and updated on a specified frequency.

Figure 3:
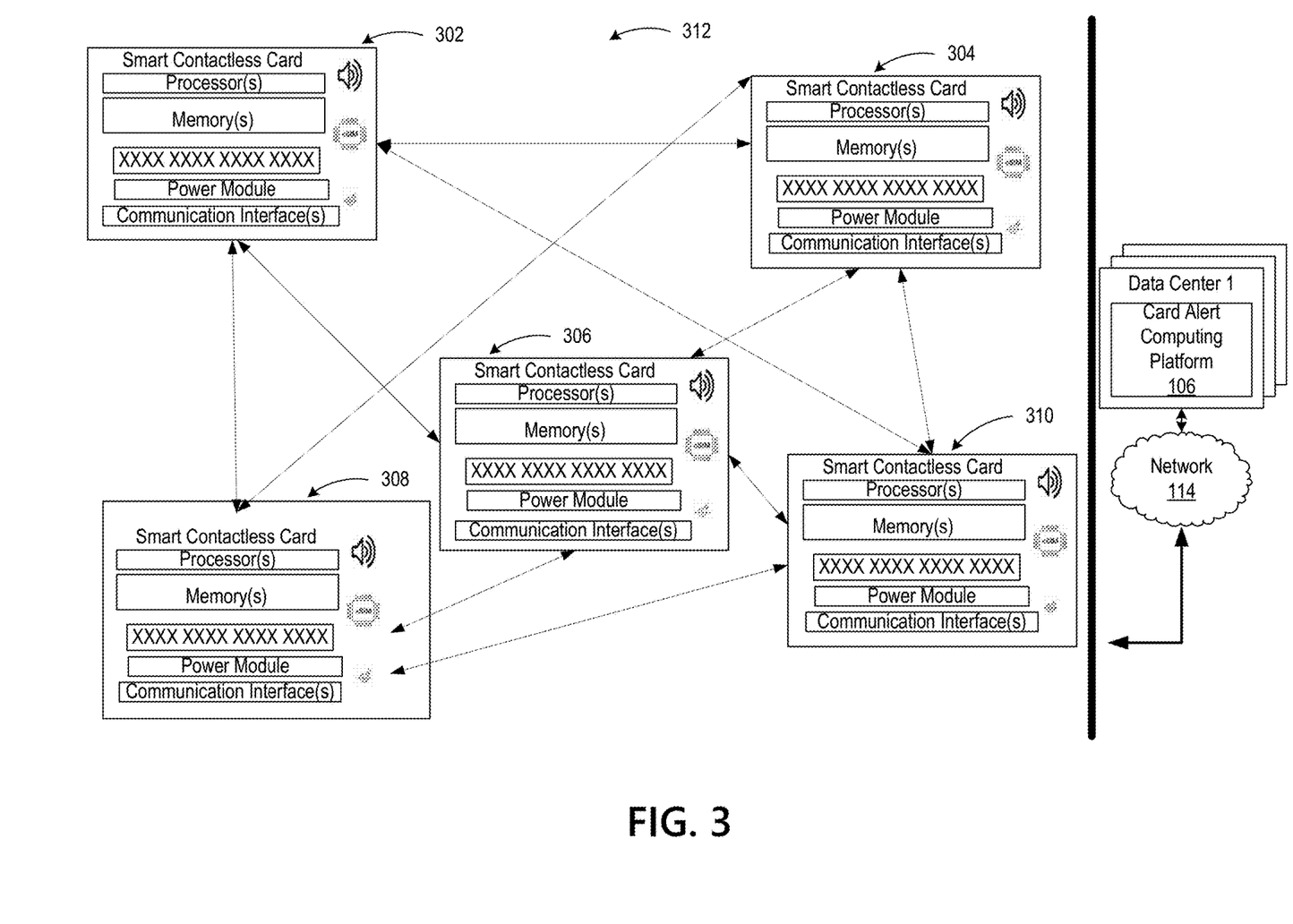
FIG. 3 illustrates a secure semi-autonomous data-sharing network according to one or more aspects described herein.

In some arrangements, a smart contactless card may be paired to other similar cards to establish a secure semi-autonomous data-sharing network 312 as shown in FIG. 3. The smart contactless cards each including a micro-embedded eSIM may communicate on secure semi-autonomous data-sharing network 312 via numerous protocols including but not limited to GSM, LTE, and 5G. Each smart contactless card 302-310 may act as an edge-computing node having computing capabilities to detect and report suspicious activity occurring at a card reader. In an embodiment, the pairing process also includes a card authentication process to enable secure sharing of data between paired cards 302-310 on the secure network. For instance, FIG. 3 illustrates a semi-autonomous card-pairing network 312 where any extracted logs and data from card readers may be processed by any of the smart contactless cards 302-310 illustrated in FIG. 3 or externally by card alert computing platform 106.

In an embodiment, a unique interaction identification number is created when a smart contactless card is paired with a second smart contactless card. The unique interaction identification number may be encrypted and linked to all transactions performed with the second smart contactless paired card.

In some instances, paired cards may be connected to a network and share information regarding detected suspicious readers or payment devices. The paired cards may alert users to detected suspicious readers. For instance, a smart contactless card such as smart contactless card 102 may determine that a particular card reader is suspicious. Smart contactless card 102 may alert all other paired smart contactless cards with information such as the geographical location of the detected suspicious card reader. Sharing of information may prevent other users from completing transactions at locations with suspicious card readers or payment devices.

Figure 5:
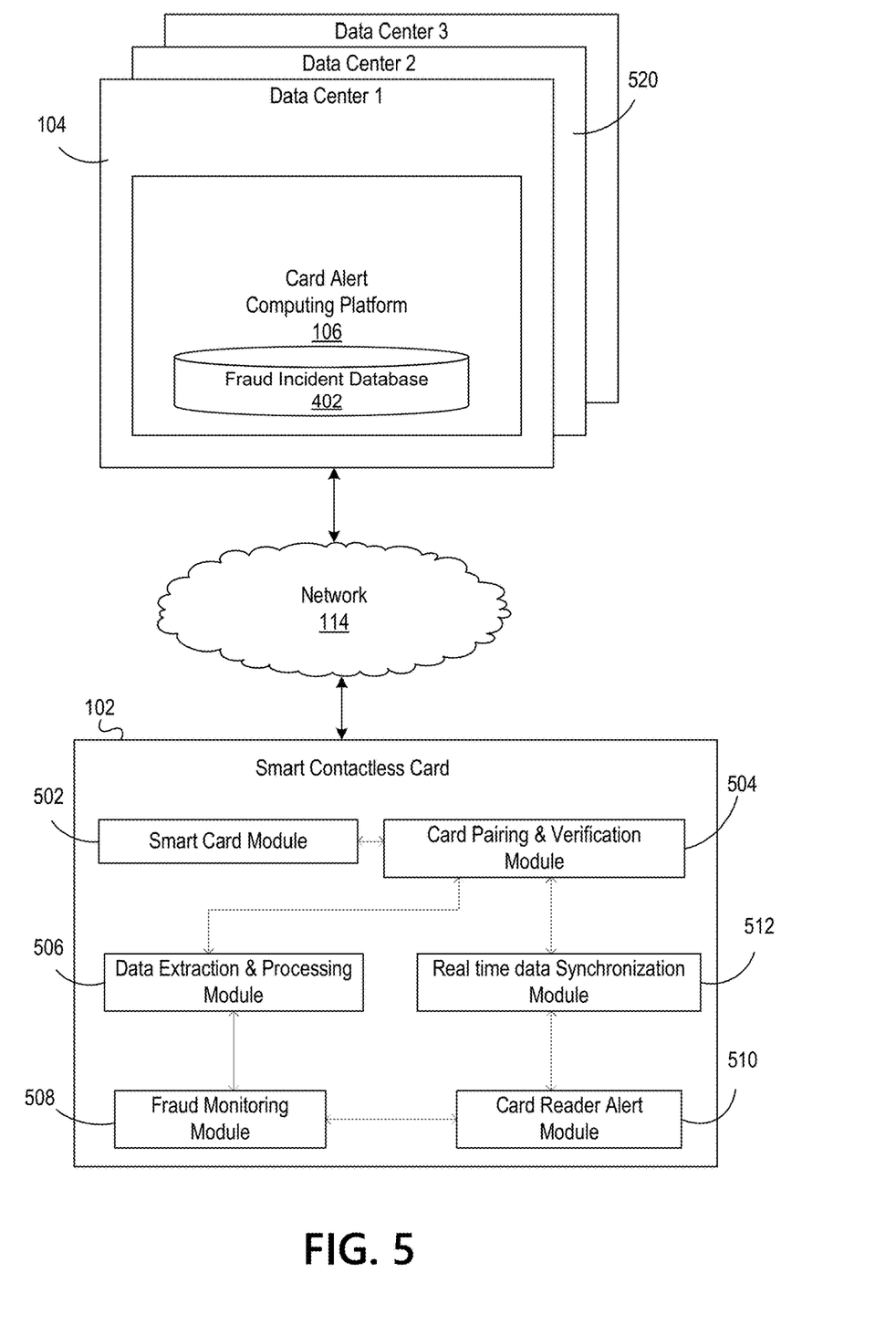
FIG. 5 illustrates additional internal architecture associated with a smart contactless card in accordance with one or more aspects described herein.

FIG. 5 illustrates additional architecture associated with each smart contactless card in accordance with various aspects of the disclosure. In some arrangements, smart contactless card 102 may include a smart card module 502, which may be in communication with card alert computing platform 106 to determine suspicious behavior of card readers. In an embodiment, smart card module 502 may correlate existing transaction codes with an instance of fraud. In an exemplary embodiment, smart contactless card 102 when interacting with a card reader may extract historical transaction details from the card reader before execution of any new transaction. Extracted data may include encrypted past transaction IDs, card details used on the card reader, and error logs. Smart card module 502 may determine if card reader is suspicious and alert user not to initiate the current transaction.

In some arrangements, a card pairing and verification module 504 may include protocols for securely pairing smart contactless cards in a semi-autonomous data-sharing network. In an embodiment, other types of smart non-contactless cards may be able to securely pair and share information regarding detected suspicious card readers.

In some aspects of the disclosure, a data extraction and processing module 506 may extract data during every transaction with a card reader or payment device. The data extraction and processing module 516 may include logs, which store detailed transaction information for each transaction of the smart contactless card 102.

In an embodiment, smart contactless card reader 102 may also include a fraud monitoring module 508 for monitoring real-time transactions for suspicious behavior. If any suspicious behavior or fraud is detected a card reader alert module 510 may alert users of the suspicious behavior or fraud. In some embodiments, a real time data synchronization module 512 may be utilized to communicate with the secure semi-autonomous data-sharing network 312 to report and share any detected suspicious card reader.

In an embodiment, data center 104 may be a distinct and physically separate data center operated by and/or otherwise associated with an organization, such as a first financial institution. Other data centers such data center 520 may be operated at a different or second financial institution, which may wish to share data with the first financial institution regarding suspicious contactless card reader via a secure API or other secure interfaces to reduce incidents of fraud on both intuitions users.

Figure 6:
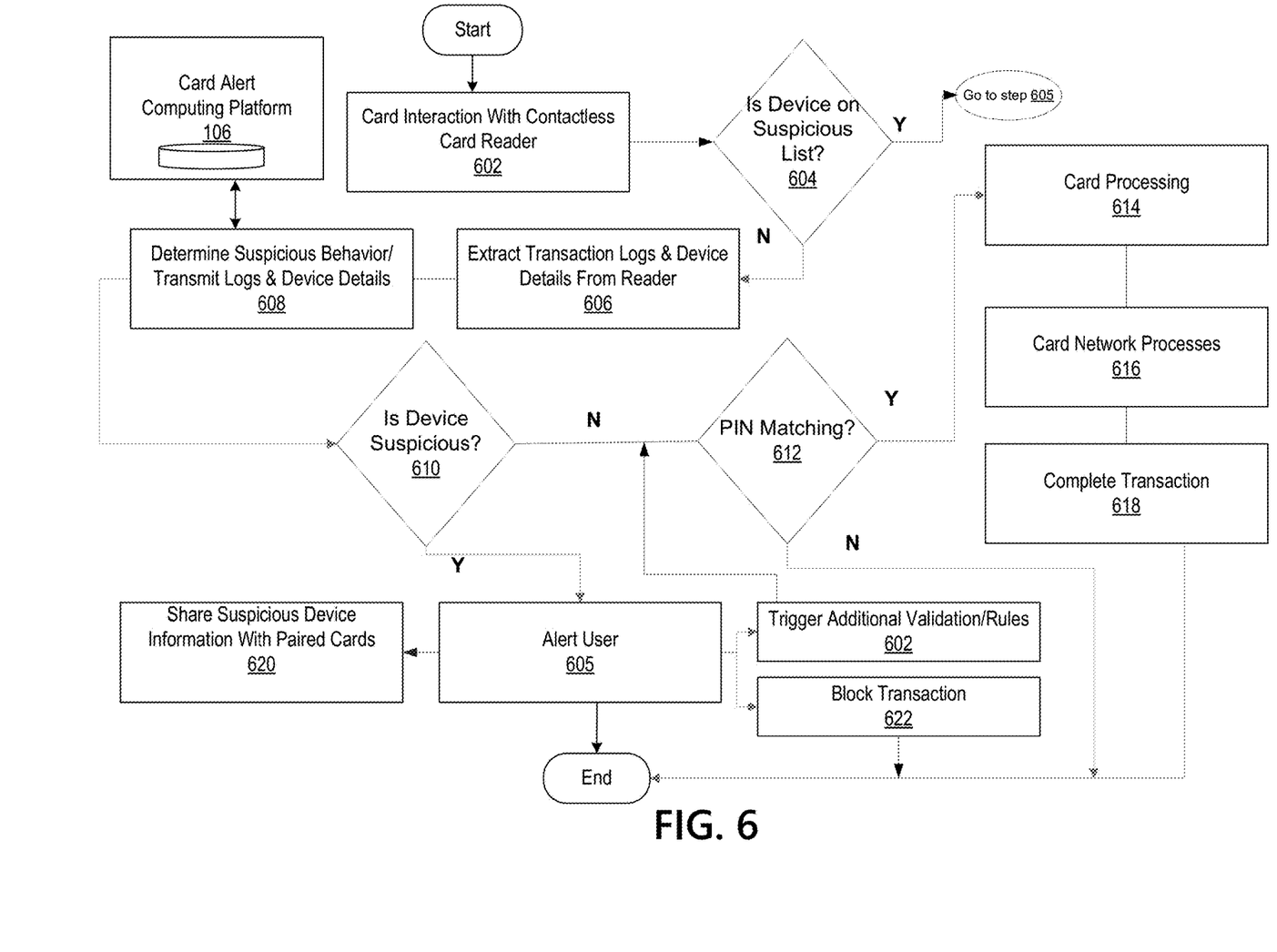
FIG. 6 depicts an illustrative block diagram for detecting a suspicious card reader that may be used to implement the processes and functions of certain aspects of the present disclosure in accordance with one or more aspects described herein.

FIG. 6 illustrates an exemplary method for detecting a suspicious card reader in accordance with one or more embodiments of the disclosure. Referring to FIG. 6, at step 602, the process is initiated by bringing the smart contactless card 102 within range of the card reader or payment device. In an embodiment, a user may be attempting to purchase an item or service using their smart contactless card 102. At step 604, smart contactless card 102 determines if the card reader is suspicious before use by the user. In an embodiment, smart contactless card 102 may determine that the card reader is on a suspicious device list based on information received by semi-autonomous data-sharing network 312. If smart contactless card 102 determines that the card reader is on the suspicious device list then the user is alerted in step 605. If smart contactless card 102 determines that the card reader is not on the suspicious device list, historical transaction data may be extracted along with transaction details from the card reader for analysis in step 606. Extracted data may include encrypted past transaction IDs, card details used on the card reader, and error logs. In step 608, smart contactless card 102 may determine in an exemplary embodiment if the card reader is suspicious by correlating existing transaction codes with instances of fraud. In an embodiment, smart card module 502 may correlate the existing transaction codes.

In an alternative embodiment, the extracted historical transaction data may be transmitted to card alert computing platform 106 for detection and analysis of suspicious behavior in step 608. In some embodiments, artificial intelligence and machine learning may be used to detect patterns or instances of fraud. For example, a LSTM neural network may be utilized to monitor card readers and generate a vulnerability score for each monitored card reader.

In one aspect of the disclosure, a generated vulnerability score may be used to determine if a card reader is suspicious. If in step 610, the card reader is determined to be suspicious then the user is alerted in step 605 and the smart contactless card 102 may share the determination with other paired cards in step 620. In another embodiment, if in step 610, the card reader is determined to be suspicious then the user is alerted in step 605 and smart contactless card 102 may block the transaction from occurring in step 622. Smart contactless card 102 may also share the alert and blocked transaction information with other paired card in step 620.

In an alternative embodiment, a user may be alerted in step 605 to a suspicious device detected in step 610, which may trigger additional validation rules to be applied to the current transaction. The number and type of additional validation rules to be applied may be based on the output of step 610 or a generated vulnerability score associated with the card reader.

If in step 610, the card reader is not determined to be suspicious then pin matching may occur in step 612. In an embodiment, if pin matching is successful in step 612 the process continues with normal payment processing techniques including card processing step 614, card network processing step 616, and transaction completion in step 618. If pin matching is not successful, in step 612, the process ends and the transaction is cancelled.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A first smart contactless card comprising:
at least one processor;
an embedded SIM (eSIM) electronic chip; and
memory storing computer-readable instructions that, when executed by the at least one processor, cause the first smart contactless card to:
wirelessly communicate with a transaction apparatus when within close proximity, wherein the transaction apparatus comprises a contactless card reader;
receive a suspicious device list via a secure semi-autonomous data-sharing network, wherein the first smart contactless card supports at least one of a credit card, a debit card, and an ATM card and wherein the first smart contactless card acts as a first edge-computing node at a periphery of the secure semi-autonomous data-sharing network;
prior to initiating a transaction with the transaction apparatus by the first smart contactless card and only when the contactless card reader is not on the suspicious device list, extract encrypted transaction logs and error logs from the transaction apparatus;
enable, by the eSIM electronic chip, pairing with at least one additional smart contactless card and communicating with a card alert computing platform and the at least one additional smart contactless card via the secure semi-autonomous data-sharing network, wherein each of the at least one additional smart contactless card acts an additional edge-computing node at the periphery of the secure semi-autonomous data-sharing network;
in response to the pairing, create an encrypted unique interaction identification number between the first smart contactless card and the at least one additional smart contactless card;
share, with the at least one additional smart contactless card via the secure semi-autonomous data-sharing network, shared information, wherein the shared information is linked to the encrypted unique interaction identification number and is indicative of any detected suspicious card readers;

select one of the first contactless card and the card alert computing platform to perform analysis of the shared information, the extracted encrypted transaction logs and error logs, wherein the card alert computing platform performs additional processing not performed at the first smart contactless card;

when performed at the first smart contactless card, analyze the shared information, the extracted encrypted transaction logs and error logs to determine suspicious activity associated with the transaction apparatus;

generate, in response to the analyzing, an alert for any determined suspicious activity associated with the transaction apparatus;

block transaction with the transaction apparatus via the contactless card reader based on determined suspicious activity;

transmit to a second smart contactless card the generated alert for the determined suspicious activity associated with the transaction apparatus;

correlate the extracted transaction logs and error logs with information contained in a fraud incident database, wherein a LSTM neural network correlates the extracted transaction logs and error logs with information contained in the fraud incident database;

determine suspicious activity based on the correlation of the extracted transaction traction logs and error logs with information contained in the fraud incident database, the determined suspicious activity associated with the transaction apparatus;

generate behavior patterns for the analyzed transaction apparatus; and determine suspicious activity based on the generated behavior patterns for the transaction apparatus.

2. The first smart contactless card of claim 1, wherein the computer-readable instructions, when executed by the at least one processor, cause the first smart contactless card to:
receive, from a second smart contactless card, an alert having information including identification of a determined suspicious card reader; and
update a suspicious device list with the identification of the determined suspicious card reader.

3. The first smart contactless card of claim 1, wherein the eSIM chip is configured to enable pairing with at least one additional smart contactless card.

4. The first smart contactless card of claim 1, wherein the computer-readable instructions, when executed by the at least one processor, cause the first smart contactless card to:
prior to blocking transaction with the transaction apparatus based on determined suspicious activity, determine if any additional validation rules are triggered; and
if additional validation rules are triggered and not met, proceed to block transaction with the transaction apparatus based on determined suspicious activity.

5. The first smart contactless card of claim 1, wherein the computer-readable instructions, when executed by the at least one processor, cause the first smart contactless card to:
generate a vulnerability score associated with the transaction apparatus.

6. A method for a first smart contactless card interacting with a transaction apparatus, the method comprising:
wirelessly communicating, by the first smart contactless card, with the transaction apparatus when within close proximity, wherein the transaction apparatus comprises a contactless card reader;

receiving a suspicious device list via a secure semi-autonomous data-sharing network, wherein the first smart contactless card supports at least one of a credit card, a debit card, and an ATM card and wherein the first smart contactless card acts as a first edge-computing node at a periphery of the secure semi-autonomous data-sharing network;

prior to initiating a transaction with the transaction apparatus by the first smart contactless card and only when the contactless card reader is not on the suspicious device list, extracting, by the first smart contactless card, encrypted transaction logs and error logs from the connected transaction apparatus;

pairing, by the first smart contactless card, the first smart contactless card with at least one additional smart contactless card;

communicating with a card alert computing platform and the at least one additional smart contactless card via the secure semi-autonomous data-sharing network, wherein each of the at least one additional smart contactless card acts an additional edge-computing node at the periphery of the secure semi-autonomous data-sharing network creating, by the first smart contactless card and response to the pairing, an encrypted unique interaction identification number between the first smart contactless card and the at least one additional smart contactless card;

sharing, by the first smart contactless card and with the at least one additional smart contactless card via the secure semi-autonomous data-sharing network, shared information, wherein the shared information is linked to the encrypted unique interaction identification number and is indicative of any detected suspicious card readers;

selecting one of the first smart contactless card and the card alert computing platform to perform analysis of the shared information, the extracted encrypted transaction logs and error logs, wherein the card alert computing platform performs additional processing not performed at the first smart contactless card;

when performed at the first smart contactless card, analyzing, by the first smart contactless card, the shared information, the extracted encrypted transaction logs and error logs to determine suspicious activity associated with the transaction apparatus;

generating, by the first smart contactless card and in response to the analyzing, an alert for any determined suspicious activity associated with the transaction apparatus;

blocking, by the first smart contactless card, transaction with the transaction apparatus via the contactless card reader based on determined suspicious activity;

transmitting, by the first smart contactless card, to a second smart contactless card the generated alert for the determined suspicious activity associated with the transaction apparatus;

correlating, by the first smart contactless card, the extracted encrypted transaction logs and error logs with information contained in a fraud incident database, wherein a LSTM neural network correlates the extracted encrypted transaction logs and error logs with information contained in the fraud incident database;

determining suspicious activity based on the correlation of the extracted encrypted logs and error logs with information contained in the fraud incident database, the determined suspicious activity associated with the transaction apparatus;

generating, by the first smart contactless card, behavior patterns for the analyzed transaction apparatus; and determining, by the first smart contactless card, suspicious activity based on the generated behavior patterns for the transaction apparatus.

7. The method of claim 6, further comprising:

receiving, from a third smart contactless card, an alert having information including identification of a determined suspicious card reader; and updating a suspicious device list with the identification of the determined suspicious card reader.

8. A system comprising:

a point-of-sale terminal; and a smart contactless card comprising:

at least one processor; and memory storing executable instructions that, when executed by the at least one processor, cause the smart contactless card to:

wirelessly communicate with the point-of-sale terminal when within close proximity, wherein the point-of-sale terminal comprises a contactless card reader;

receive a suspicious device list via a secure semi-autonomous data-sharing network, wherein the smart contactless card supports at least one of a credit card, a debit card, and an ATM card and wherein the smart contactless card acts as a first edge-computing node at a periphery of the secure semi-autonomous data-sharing network;

prior to initiating a transaction with the point-of-sale terminal by the smart contactless card and only when the contactless card reader is not on the suspicious device list, extract encrypted transaction logs and error logs from the connected point-of-sale terminal;

pair the smart contactless card with at least one additional smart contactless card;

communicate with a card alert computing platform and the at least one additional smart contactless card via the secure semi-autonomous data-sharing network, wherein each of the at least one additional smart contactless card acts an additional edge-computing node at the periphery of the secure semi-autonomous data-sharing network       create, in response to the pairing, an encrypted unique interaction identification number between the smart contactless card and the at least one additional smart contactless card;

share, via the secure semi-autonomous data-sharing network, shared information with the at least one additional smart contactless card, wherein the shared information is linked to the encrypted unique interaction identification number and is indicative of any detected suspicious card readers;

select one of the smart contactless card and the card alert computing platform to perform analysis of the shared information, the extracted encrypted transaction logs and error logs, wherein the card alert computing platform performs additional processing not performed at the smart contactless card;

when performed at the smart contactless card, analyze the shared information, the extracted encrypted transaction logs and error logs to determine suspicious activity associated with the point-of-sale terminal; and       generate, in response to the analyzing, an alert for any determined suspicious activity associated with the point-of-sale terminal;

block transaction with the point-of-sale terminal via the contactless card reader based on determined suspicious activity;

transmit to a second smart contactless card the generated alert for the determined suspicious activity associated with the transaction apparatus;

correlate the extracted encrypted transaction logs and error logs with information contained in a fraud incident database, wherein a LSTM neural network correlates the extracted encrypted transaction logs and error logs with information contained in the fraud incident database;

determine suspicious activity based on the correlation of the extracted encrypted transaction logs and error logs with information contained in the fraud incident database, the determined suspicious activity associated with the point-of-sale terminal;

generate behavior patterns for the analyzed point-of-sale terminal; and       determine suspicious activity based on the generated behavior patterns for point-of-sale terminal.

\* \* \* \* \*